United States Patent
Chowdhury et al.

(10) Patent No.: US 8,166,519 B2
(45) Date of Patent: Apr. 24, 2012

(54) PROVIDING MOBILITY MANAGEMENT USING EMULATION

(75) Inventors: Kuntal Chowdhury, Plano, TX (US); Kevin Cramer, Woodinville, WA (US)

(73) Assignee: Cisco Technology, Inc., San Jose, CA (US)

( * ) Notice: Subject to any disclaimer, the term of this patent is extended or adjusted under 35 U.S.C. 154(b) by 522 days.

(21) Appl. No.: 12/330,195

(22) Filed: Dec. 8, 2008

(65) Prior Publication Data

US 2009/0172785 A1 Jul. 2, 2009

Related U.S. Application Data

(60) Provisional application No. 61/012,399, filed on Dec. 7, 2007.

(51) Int. Cl.
G06F 7/04 (2006.01)
G06F 17/30 (2006.01)
H04W 4/00 (2009.01)

(52) U.S. Cl. ............................ 726/2; 726/4; 455/422.1

(58) Field of Classification Search ..................... None
See application file for complete search history.

(56) References Cited

U.S. PATENT DOCUMENTS

| | | | |
|---|---|---|---|
| 6,862,274 B1 | 3/2005 | Tsao et al. | |
| 7,236,781 B2 * | 6/2007 | Patil et al. | 455/432.1 |
| 7,356,020 B2 * | 4/2008 | O'Neill | 370/349 |
| 2002/0194259 A1 | 12/2002 | Flykt et al. | |
| 2003/0158938 A1 | 8/2003 | Adatrao et al. | |
| 2003/0225900 A1 | 12/2003 | Morishige et al. | |
| 2004/0088385 A1 | 5/2004 | Blanchet et al. | |
| 2004/0148428 A1 | 7/2004 | Tsirtsis | |
| 2004/0184465 A1 | 9/2004 | Lee et al. | |
| 2005/0010252 A1 | 1/2005 | Ideker | |
| 2006/0018291 A1 | 1/2006 | Patel et al. | |
| 2006/0062176 A1 | 3/2006 | Ikemura et al. | |
| 2007/0086382 A1 * | 4/2007 | Narayanan et al. | 370/331 |
| 2007/0094712 A1 | 4/2007 | Gibbs et al. | |
| 2007/0189219 A1 * | 8/2007 | Navali et al. | 370/331 |
| 2007/0189255 A1 | 8/2007 | Navali et al. | |
| 2007/0208864 A1 | 9/2007 | Flynn et al. | |
| 2007/0268919 A1 * | 11/2007 | Sarikaya et al. | 370/401 |
| 2008/0205342 A1 | 8/2008 | Radhakrishnan et al. | |
| 2008/0285518 A1 * | 11/2008 | Dutta et al. | 370/331 |
| 2010/0041373 A1 | 2/2010 | Ramankutty et al. | |

OTHER PUBLICATIONS

Taaghol et al., "Seamless Intergration of Mobile WiMAX in 3GPP Networks", IEEE Communications Magazine, Oct. 2008, pp. 74-85.*
International Search Report and Written Opinion issued for corresponding International Patent Application No. PCT/US2008/085881.

* cited by examiner

*Primary Examiner* — William Powers
(74) *Attorney, Agent, or Firm* — Wilmer Cutler Pickering Hale and Dorr LLP

(57) ABSTRACT

A system and method are disclosed for providing mobility management among mobile nodes in a communication network. Emulation can be provided to allow a mobile node that uses mobile IP (MIP) to access and use a communication network that is based on proxy mobile IP (PMIP). A gateway can be used to terminate the MIP based protocol access from the mobile node and communicate with the PMIP based core network. Emulation can be provided on a gateway to provide communication from a internet protocol version 4 (IPv4) mobile node and a core network running internet protocol version 6 (IPv6). This allows the network operator to provide access to the deployed base of MIP or IPv4 mobile nodes.

20 Claims, 6 Drawing Sheets

PROVIDING MOBILITY MANAGEMENT USING EMULATION

CROSS REFERENCE TO RELATED APPLICATIONS

This application claims benefit under 35 U.S.C. §119(e) of U.S. Provisional Patent Application No.: 61/012,399, entitled "Providing Mobility Management Using Emulation," filed Dec. 7, 2007, which is hereby incorporated by reference herein in its entirety.

FIELD OF THE DISCLOSURE

This disclosure relates to a system and method for providing mobility management among network devices in a communication network.

BACKGROUND

Wireless networks are telecommunications networks that use both wire and radio waves to carry information from one node in the network to one or more receiving nodes in the network. Cellular telephony is characterized by the use of radio cells that provide radio coverage for a set geographic area, with multiple cells arranged to provide contiguous radio coverage. The first generation of wireless telephone technology were analog mobile phones in which analog signals were modulated and transmitted. As technology progressed a second generation (2G) of wireless service was introduced. In the 2G systems, the radio signals modulate digital information signals. Second generation technologies used time division multiplexed access (TDMA) or code division multiplexed access (CDMA) technologies. Such networks that were upgraded to handle higher-speed packet data in networks referred to as 2.5G and 3G networks. The 3rd Generation Partnership Project (3GPP) and the 3rd Generation Partnership Project 2 (3GPP2) respectively developed GSM/UMTS/HSDPA and cdmaOne/CDMA2000 technologies. The next evolution is 4G technology, which is referred to as long term evolution-system architecture evolution (LTE-SAE) and uses orthogonal frequency division multiple access (OFDMA) technology.

Other wireless protocols have also developed including WiFi, an implementation of various IEEE 802.11 protocols, WiMAX, an implementation of IEEE 802.16, and HiperMAN, which is based on an ETSI alternative to IEEE 802.16.

Wireless communication technologies are used in connection with many applications, including, for example, satellite communications systems, portable digital assistants (PDAs), laptop computers, and mobile devices (e.g., cellular telephones, user equipment). One significant benefit that users of such applications obtain is the ability to connect to a network (e.g., the Internet) as long as the user is within range of such a wireless communication technology. Current wireless communication systems use either, or a combination of, circuit switching and packet switching in order to provide mobile data services to mobile devices. Generally speaking, with circuit-based approaches, wireless data is carried by a dedicated (and uninterrupted) connection between the sender and recipient of data using a physical switching path. Once the direct connection is set-up, it is maintained for as long as the sender and receiver have data to exchange. The establishment of such a direct and dedicated switching path results in a fixed share of network resources being tied up until the connection is closed. When the physical connection between the sender and the receiver is no longer desired, it is torn-down and the network resources are allocated to other users as necessary.

Packet-based approaches, on the other hand, do not permanently assign transmission resources to a given session, and do not require the set-up and tear-down of physical connections between a sender and receiver of data. In general, a data flow in packet-based approaches is divided into separate segments of information. These segments can include "header" information that may provide, for example, source information, destination information, information regarding the number of bits in the packet, priority information, and security information. The packets are then routed to a destination independently, based on the header information. The data flow may include a number of packets or a single packet. The packets can also be data packets that carry information useable by the user or control packets that carry information used by the system to provide service to the user.

SUMMARY OF THE DISCLOSURE

Systems and methods that provide mobility management to mobile nodes using emulation in a communications network are disclosed in some embodiments. Emulation can be provided to allow a mobile node that uses mobile IP (MIP) to access and use a communication network that is based on proxy mobile IP (PMIP). A gateway can be used to terminate the MIP based protocol access from the mobile node and communicate with the PMIP based core network. Emulation can be provided on a gateway to provide communication from a internet protocol version 4 (IPv4) mobile node and a core network running internet protocol version 6 (IPv6). This allows the network operator to provide access to the deployed base of MIP or IPv4 mobile nodes.

In some embodiments, a method of providing communication network access is provided that comprises receiving a mobile IP (MIP) registration request at a mobility access gateway (MAG) from a mobile node, transmitting from the MAG a proxy mobile IP (PMIP) binding update to a local mobility anchor (LMA) to request an IP version 4 (IPv4) based address, receiving at the MAG a PMIP binding acknowledgement from the LMA with the IPv4 address; and transmitting from the MAG a MIP registration reply including the IPv4 address.

In other embodiments, a gateway in a communication network is provided that comprises a mobility access gateway (MAG) that provides emulation of mobile IP (MIP) version 4 over an internet protocol (IP) version 6 network, the MAG receiving a registration request from a mobile node in MIP version 4, transmitting a proxy mobile IP (PMIP) version 6 binding update to a local mobility anchor (LMA) to request an IP version 4 (IPv4) based address, receiving a PMIP version 6 binding acknowledgment with the IPv4 based address, and transmitting the IPv4 address to the mobile node.

In yet other embodiments, a method of providing communication network access is provided that comprises sending a mobile IP (MIP) registration request from a mobile node to a mobility access gateway (MAG) to obtain an IP version 4 (IPv4) based address from a local mobility anchor (LMA) operating in an internet protocol (IP) version 6 based network, wherein the registration request includes identification information of the mobile node, and receiving at the mobile node a MIP registration reply including the IPv4 address transmitted over the PMIP based network from the LMA.

DETAILED DESCRIPTION

Systems and methods that provide mobility management to mobile nodes using emulation in a communications network are disclosed in some embodiments. A gateway may be used to implement the mobility management on packet flows for communications networks. Residing within the gateway can be one or more network processing units, line cards, as well as packet and voice processing cards. Gateways can be used to provide one or more functional network entities such as a mobility access gateway (MAG), packet data serving node (PDSN), a high rate packet data (HRPD) serving gateway (HSGW), a local mobility anchor (LMA), a home agent (HA), a PDN gateway (P-GW), or a foreign agent (FA). The gateway can be used to implement mobile IP (MIP) emulation with proxy mobile IP (PMIP) in some embodiments.

There is a large deployed base of communication equipment utilizing client mobile IP version 4 (CMIPv4) or mobile IP version 4 (MIPv4) today. Future 4th generation (4G) networks plan to use proxy mobile IP version 6 (PMIPv6). This creates a situation where two sets of mobility protocols are used by an operator: CMIPv4 for existing 3rd generation (3G) mobile nodes and PMIPv6 for 4G mobile nodes. A problem with this move from 3G to 4G is that CMIPv4 and PMIPv6 are implemented in different ways. CMIPv4 is a client controlled mobility management protocol, while PMIPv6 is a network controlled mobility management protocol. Further, the security requirements for CMIPv4 and PMIPv6 are different and 3G mobile nodes are not capable of supporting PMIPv6 without major modifications or replacement, which may not be practical. In some embodiments, the IP anchor (e.g., the LMA for PMIPv6 and CMIPv4) can be modified to support co-location of the two protocols. The LMA can be a home agent in CDMA networks or a packet data network gateway (PDN GW or P-GW) in system architecture evolution (SAE) 4G networks. The MAG can be implemented by a PDSN in a CDMA network, an HSGW in an eHRPD system, or a mobile management entity (MME) in a SAE 4G network.

In certain embodiments, CMIPv4 for 3G mobile nodes is terminated at the edge of the 3G network (e.g., the MAG can be a PDSN for a CDMA network). PMIPv6 can be implemented between the MAG and the LMA. Additionally, the MAG can provide security across protocols such as CMIPv4 and PMIPv6. A mobile node-authentication, authorization, and accounting authentication extension (MN-AAA AE) can be used to perform access authentication in a MAG. This authentication extension can be used to maintain security and authenticate the mobile node across protocols. Otherwise, CMIPv4 mobile nodes typically do not attempt access authorization during point to point protocol (PPP) or link layer setup and PMIPv6 may not include per mobile node authentication at the LMA. The MAG can also receive a MN-HA key for future signaling use from the AAA.

Figure 1:
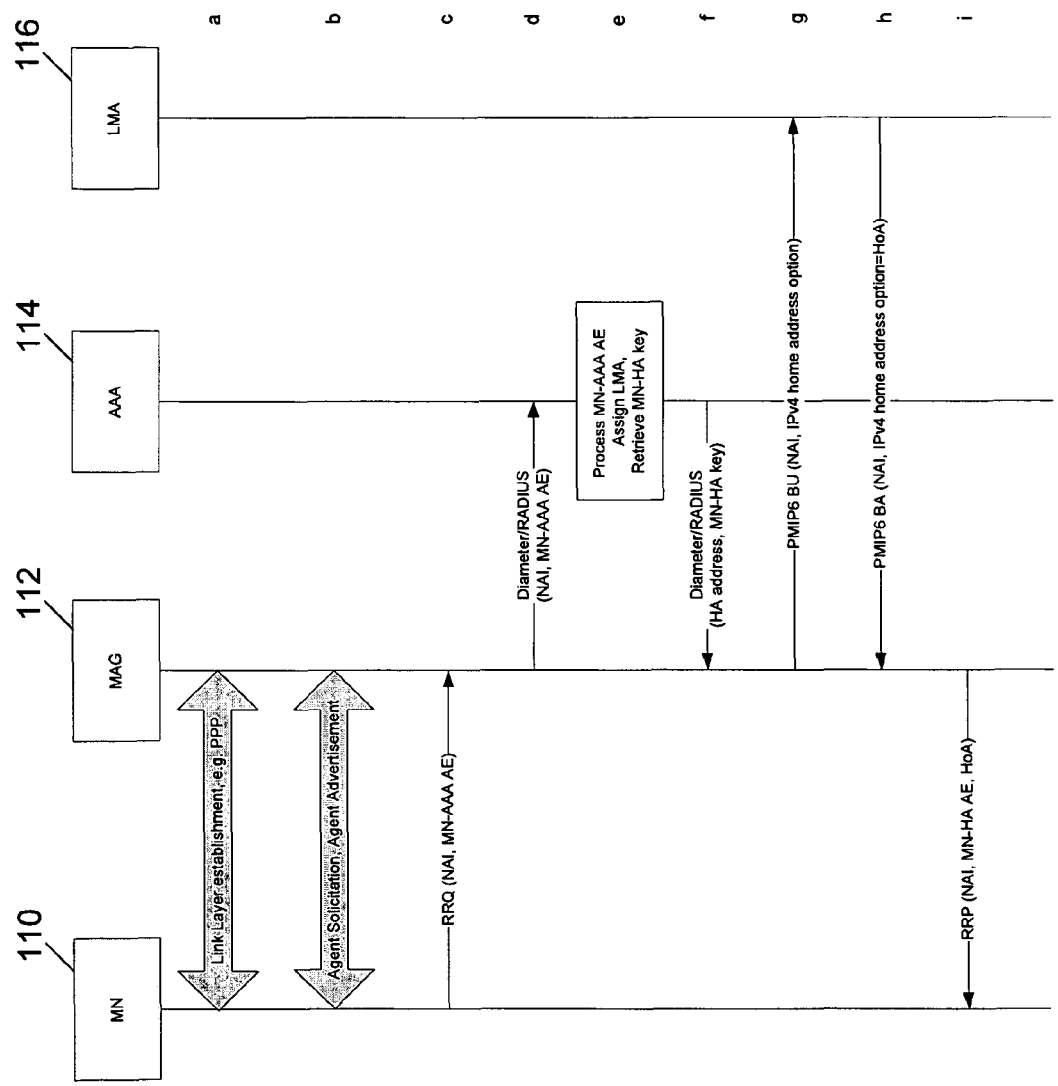
FIG. 1 illustrates a setup for mobile IP emulation in accordance with certain embodiments.

FIG. 1 illustrates a connection setup for mobile IP emulation in accordance with some embodiments. FIG. 1 includes a mobile node (MN) 110, mobility access gateway (MAG) 112, authentication, authorization, and accounting (AAA) server 114, and local mobility anchor (LMA) 116. In line a, a link layer is established between MN 110 and MAG 1 12. This link layer can be established using a point-to-point protocol (PPP), for example. In line b, agent solicitation and agent advertisement occurs. In line c, a registration request (RRQ) including a network access identifier (NAI) and MN-AAA AE are sent to MAG 112 for MN 110. In line d, MAG 112 sends a diameter/RADIUS message to AAA 114 including the NAI and MN-AAA AE. In line e, the MN-AAA AE is processed for purposes of access authentication, a LMA is assigned to MN 110, and a MN-HA key is retrieved for the session. In line f, a diameter/RADIUS message is sent to MAG 112 with the LMA address of the assigned LMA and the MN-HA key for the session. In line g, MAG 112 sends a PMIPv6 binding update (BU) that includes the NAI and a request for a TPv4 home address. In line h, HA 116 sends a PMIPv6 binding acknowledgement (BA) with an TPv4 home address (HoA). In line i, a registration reply from MAG 112 is sent to MN 110 with the NAI, the MN-HA AE, and the HoA. The emulation allows the network to treat CMIPv4 as an access protocol, while providing use of PMIPv6 in the core network. Using one protocol in the network core can simplify network operation.

Figure 2:
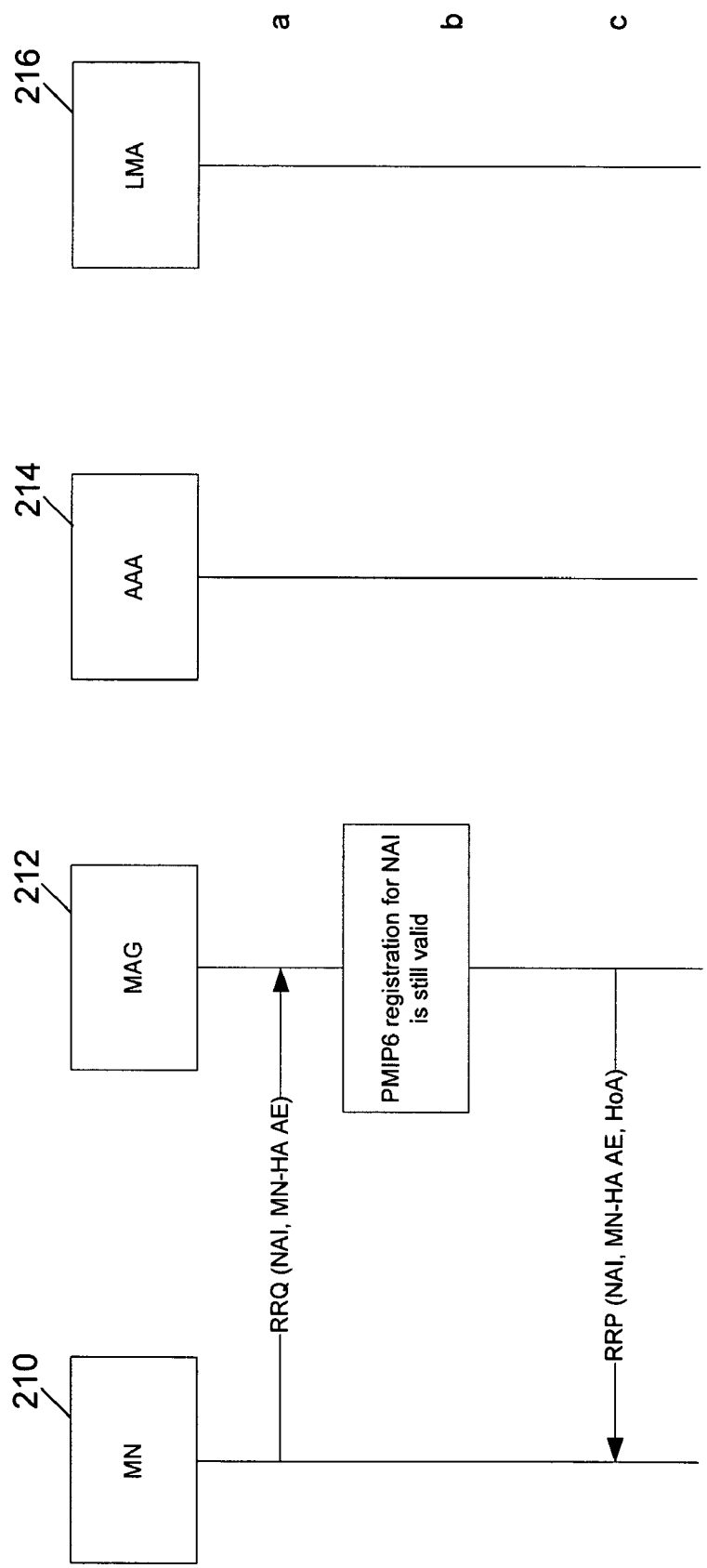
FIG. 2 illustrates mobile IP (MIP) refresh handling with emulation in accordance with some embodiments.

FIG. 2 illustrates mobile IP refresh handling with emulation in accordance with some embodiments. FIG. 2 includes a mobile node 210, a mobility access gateway (MAG) 212, an AAA 214, and a local mobility anchor (LMA) 216. In line a, a registration request is sent from MN 210 to MAG 212 including a NAI and a MN-HA AE. This MN-HA AE can be the authentication extension (AE) assigned by AAA 214. The MN-HA can be used to identify the PMIPv6 session within MAG 212 and it may identify the LMA 216 providing the mobility anchor in some embodiments. In line b, MAG 212 checks and determines the PMIPv6 registration is still valid. In line c, MAG 212 sends a registration reply including a NAI, a MN-HA, and a HoA which can confirm the registration is still valid to MN 210.

Figure 3:
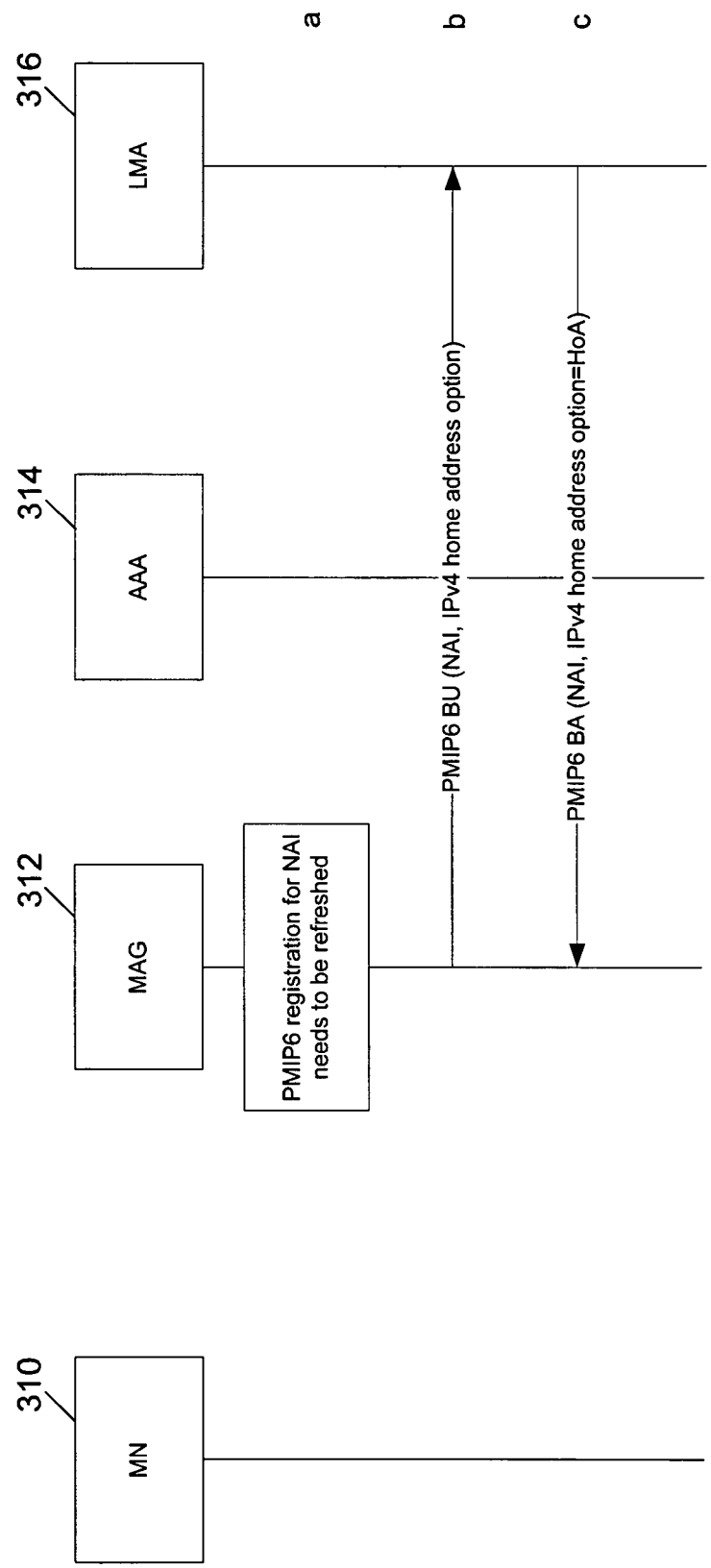
FIG. 3 illustrates proxy mobile IP (PMIP) refresh handling with emulation in accordance with certain embodiments.

FIG. 3 illustrates PMIP refresh handling with emulation in accordance with certain embodiments. FIG. 3 includes a MN 310, a MAG 312, a AAA 314, and a LMA 316. In line a, MAG 312 determines PMIPv6 registration for a particular NAI needs to be refreshed. In line b, MAG 312 sends a PMIPv6 binding update (BU) message including the NAI and a TPv4 home address option. In line c, LMA 316 returns a PMIPv6 binding acknowledgement (BA) with the NAI and with a HoA in the TPv4 home address option. The home address option can be used to carry an TPv4 address over an TPv6 based network to the TPv4 based mobile node.

Figure 4:
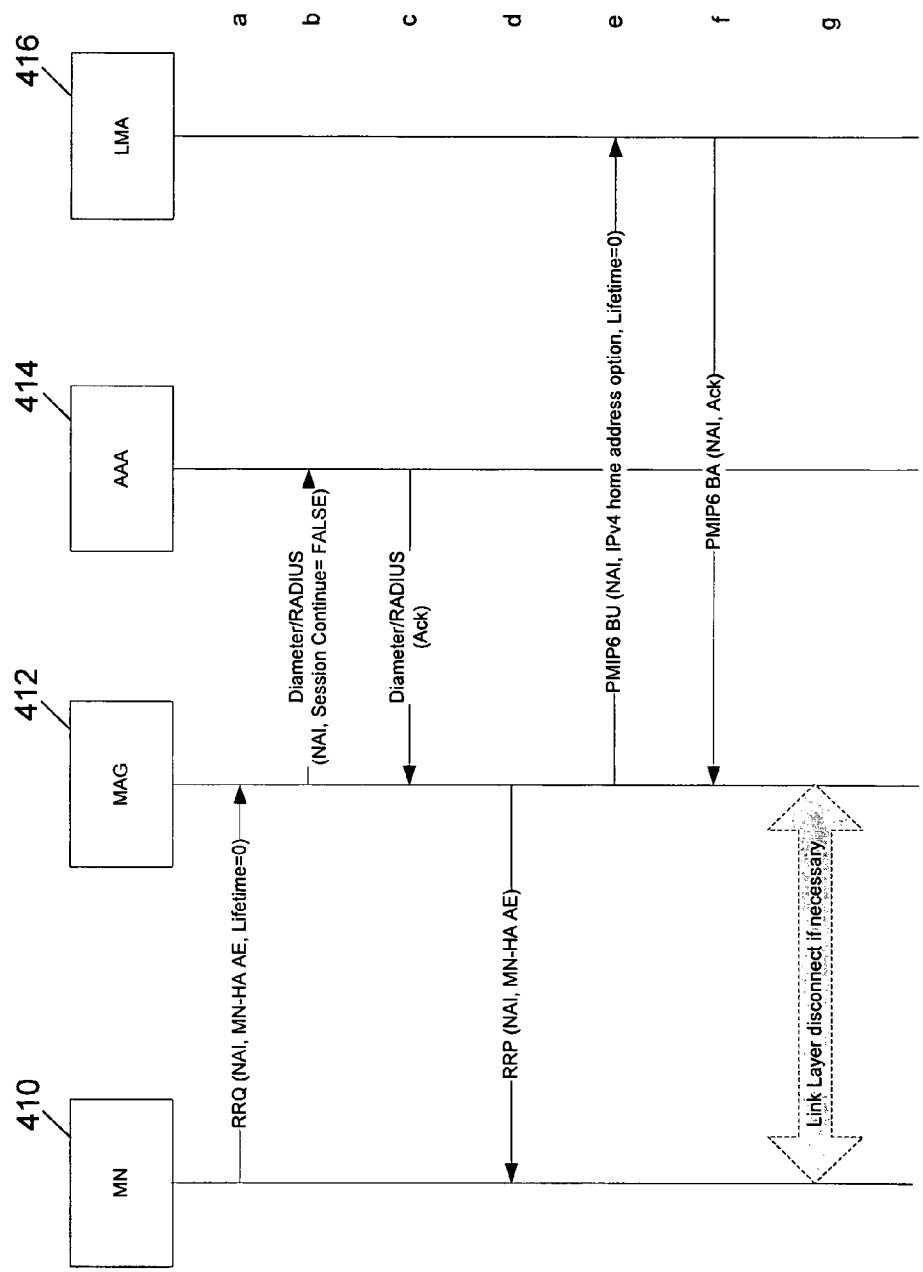
FIG. 4 illustrates MIP de-registration handling with emulation in accordance with certain embodiments.

FIG. 4 illustrates MIP de-registration handling with emulation in accordance with certain embodiments. FIG. 4 includes a MN 410, a MAG 412, an AAA 414, and a LMA 416. In line a, MN 410 sends a registration request with the NAI, the MN-HA AE, and a lifetime=0. The lifetime of 0 indicates that the session can be ended. In line b, MAG 412 sends a Diameter/RADIUS message with the NAI and a session continue=false. In line c, AAA 414 sends an acknowledgement (ack) of the request to end the session. In line d, a registration reply is sent to MN 410 to acknowledge the de-registration. In line e, MAG 412 begins tearing down the PMIPv6 session and notifies the LMA 416. A PMIPv6 binding update (BU) is sent to the LMA 416 with the NAI, the IPV4 home address option, and a lifetime=0. In line f, LMA 416 sends a PMIPv6 binding acknowledgement (BA) with an acknowledgement of the session deregistration. In line g, the link layer between MN 410 and MAG 412 can be disconnected.

Figure 5:
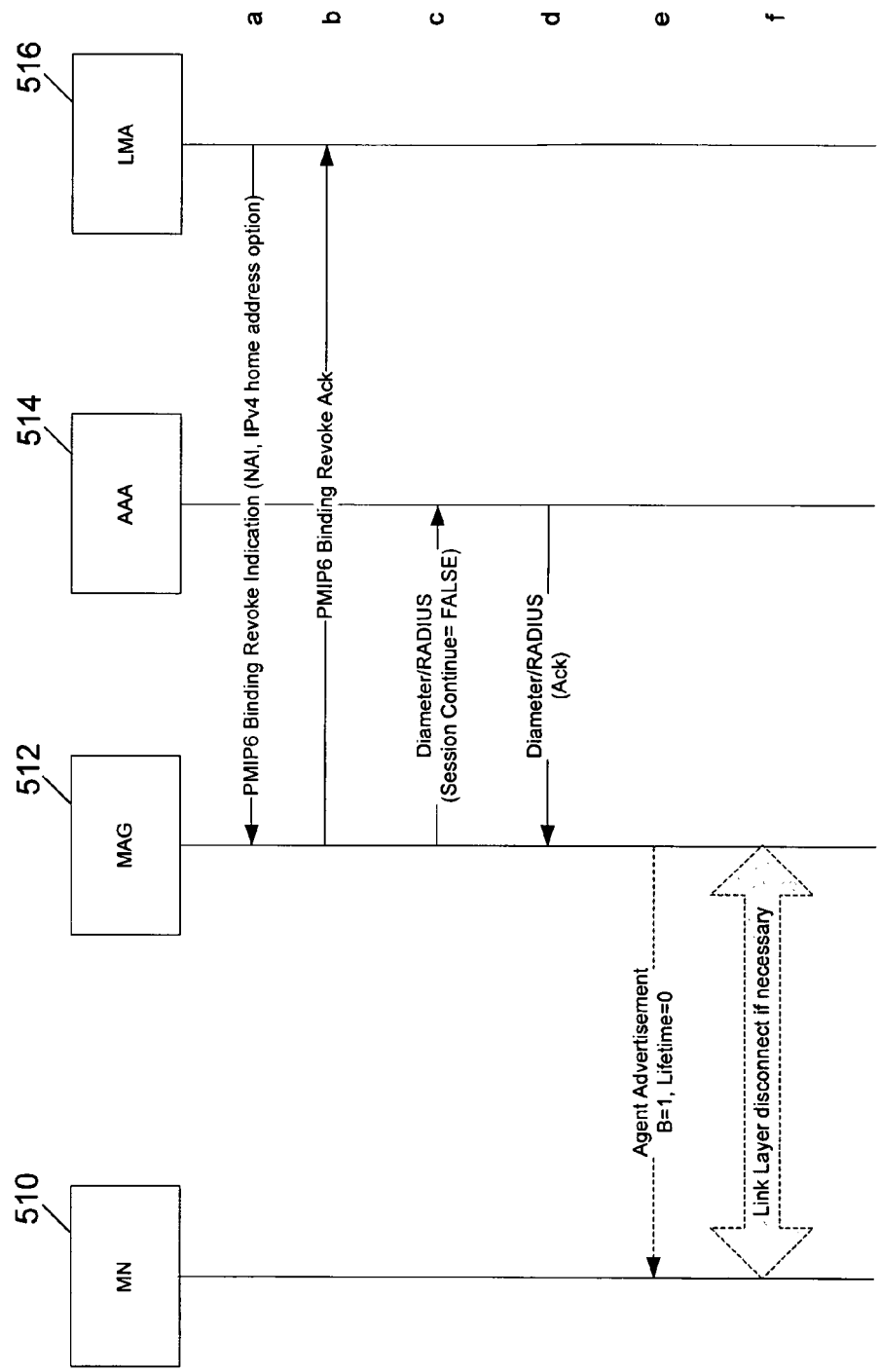
FIG. 5 illustrates PMIP registration revocation handling in accordance with some embodiments.

FIG. 5 illustrates PMIPv6 registration revocation handling in accordance with some embodiments. FIG. 5 includes a MN 510, a MAG 512, an AAA 514, and a LMA 516. In line a, LMA 516 sends a PMIPv6 binding revoke indication message that includes a NAI and a IPv4 home address option. In line b, MAG 512 sends a PMIPv6 binding revoke acknowledgement message. In line c, MAG 512 sends a Diameter/RADIUS message to AAA 514 that includes a session continue=false. In line d, AAA 514 sends a Diameter/RADIUS acknowledgement message. In line e, MAG 512 can optionally send an agent advertisement with a B=1 and a lifetime=0. This may be used to end the CMIPv4 session. The link layer may also be disconnected as well in line f.

In some embodiments, security is maintained with the emulation of CMIPv4 to CMIPv4 mobile nodes. This can be accomplished with access authentication with MN-AAA AE and a MN-HA AE, which can be used to secure a registration reply and subsequent registration requests, as shown in FIGS. 1-5. In certain embodiments, the CMIPv4 and PMIPv6 can operate independently. The emulation can also provide streamlined mobility management in the core network. The MAG and the LMA described in connection with the FIGS. 1-5 can be implemented in a gateway in some embodiments.

This gateway can implement multiple and different integrated functionalities. In some embodiments, one or more of a mobility access gateway (MAG), an HRPD serving gateway (HSGW), a mobility management entity (MME), a packet data serving node (PDSN), a foreign agent (FA), a local mobility anchor (LMA), a PDN gateway (P-GW), a home agent (HA) can be implemented on a gateway. Other types of functionalities can also be implemented on a gateway in other embodiments are a Gateway General packet radio service Support Node (GGSN), a serving GPRS support node (SGSN), a packet data inter-working function (PDIF), an access service network gateway (ASNGW), a base station, a access network, a User Plane Entity (UPE), an IP Gateway, an access gateway, a session initiation protocol (SIP) server, a proxy-call session control function (P-CSCF), and an interrogating-call session control function (I-CSCF). In certain embodiments, one or more of the above-mentioned other types of functionalities are integrated together or provided by the same functionality. For example, an access network can be integrated with a PDSN. A gateway can include a PDSN, a FA, a HA, a GGSN, a PDIF, an ASNGW, a UPE, an IP Gateway, an access gateway, or any other applicable access interface device. In certain embodiments, a gateway is provided by Starent Networks, Corp. of Tewksbury, Mass. in a ST16 or a ST40 multimedia platform.

Figure 6:
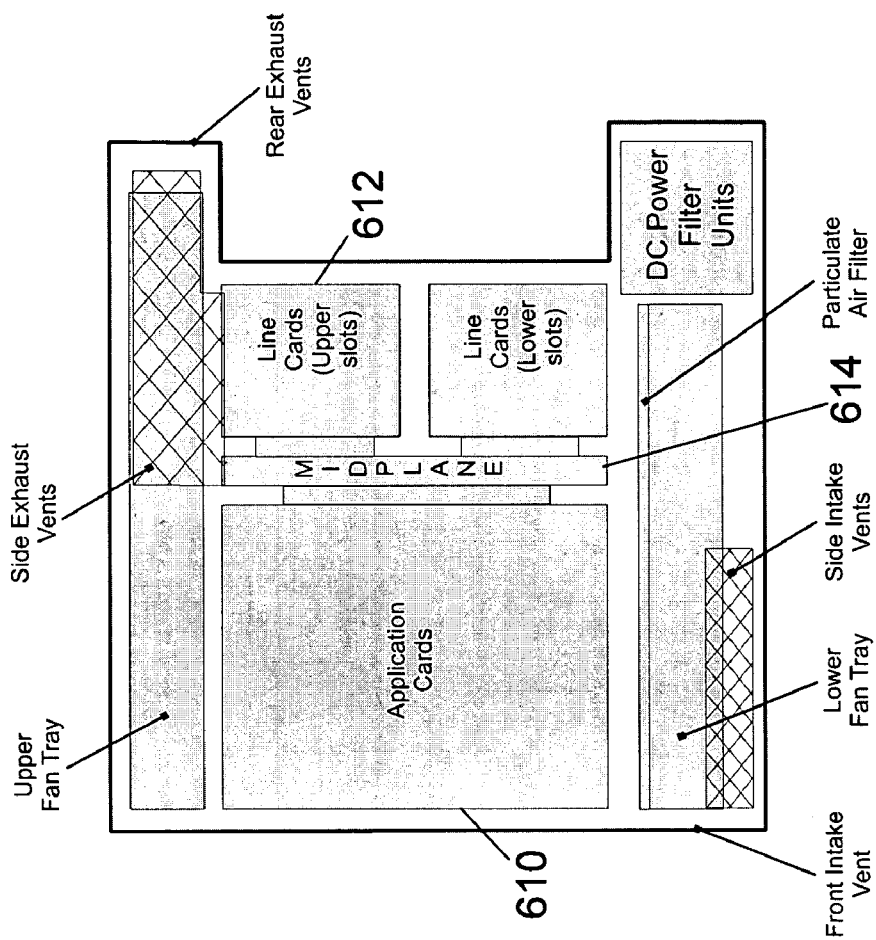
FIG. 6 illustrates a gateway in accordance with certain embodiments.

FIG. 6 illustrates a gateway in accordance with certain embodiments. The gateway can include slots for loading application cards 610 and line cards 612. A midplane 614 can be used in the gateway to provide intra-gateway communications, power connections, and transport paths between the various installed cards. The midplane 614 can include buses such as a switch fabric, a control bus, a system management bus, a redundancy bus, and a time division multiplex (TDM) bus. The switch fabric is an IP-based transport path for user data throughout the gateway implemented by establishing inter-card communications between application cards and line cards. The control bus interconnects the control and management processors within the gateway. The gateway management bus provides management of system functions such as supplying power, monitoring temperatures, board status, data path errors, card resets, and other failover features. The redundancy bus provides transportation of user data and redundancy links in the event of hardware failures. The TDM bus provides support for voice services on the system.

The gateway supports at least two types of application cards: a switch processor card and a packet accelerator card. The switch processor card serves as a controller of the gateway and is responsible for such things as initializing the gateway and loading software configurations onto other cards in the gateway. The packet accelerator card provides packet processing and forwarding capabilities. Each packet accelerator card is capable of supporting multiple contexts. Hardware engines can be deployed with the card to support parallel distributed processing for compression, classification traffic scheduling, forwarding, packet filtering, and statistics compilations.

The packet accelerator card performs packet-processing operations through the use of control processors and a network processing unit (NPU). The network processing unit determines packet processing requirements; receives and transmits user data frames to/from various physical interfaces; makes IP forwarding decisions; implements packet filtering, flow insertion, deletion, and modification; performs traffic management and traffic engineering; modifies/adds/strips packet headers; and manages line card ports and internal packet transportation. The control processors, also located on the packet accelerator card, provide packet-based user service processing. The line cards when loaded in the gateway provide input/output connectivity and can also provide redundancy connections as well.

In some embodiments, a ST40 embodiment of the gateway can support a system management card (SMC) and a packet services card (PSC), which are application cards 610. The system management card is a system control and management card for managing and controlling other cards in the gateway. The packet services card is a high-speed processing card that provides mutli-threaded point-to-point, packet data processing, and context processing capabilities, among other things.

The operating system software can be based on a Linux software kernel and run specific applications in the gateway such as monitoring tasks and providing protocol stacks. The software allows gateway resources to be allocated separately for control and data paths. For example, certain packet accelerator cards can be dedicated to performing routing or security control functions, while other packet accelerator cards are dedicated to processing user session traffic. As network requirements change, hardware resources can be dynamically deployed to meet the requirements in some embodiments. The system can be virtualized to support multiple logical instances of services, such as technology functions (e.g., a MAG, LMA, HSGW, P-GW, MME, PDSN, ASNGW, PDIF, HA, GGSN, or IPSG).

The gateway's software can be divided into a series of tasks that perform specific functions. These tasks communicate with each other as needed to share control and data information throughout the gateway. A task is a software process that performs a specific function related to system control or session processing. Three types of tasks operate within the gateway in some embodiments: critical tasks, controller tasks, and manager tasks. The critical tasks control functions that relate to the gateway's ability to process calls such as gateway initialization, error detection, and recovery tasks. The controller tasks mask the distributed nature of the software from the user and perform tasks such as monitor the state of subordinate manager(s), provide for intra-manager communication within the same subsystem, and enable inter-subsystem communication by communicating with controller(s) belonging to other subsystems. The manager tasks can control system resources and maintain logical mappings between system resources.

Individual tasks that run on processors in the application cards can be divided into subsystems. A subsystem is a software element that either performs a specific task or is a culmination of multiple other tasks. A single subsystem can include critical tasks, controller tasks, and manager tasks. Some of the subsystems that can run on a gateway include a system initiation task subsystem, a high availability task subsystem, a recovery control task subsystem, a shared configuration task subsystem, a resource management subsystem, a virtual private network subsystem, a network processing unit subsystem, a card/slot/port subsystem, and a session subsystem.

The system initiation task subsystem is responsible for starting a set of initial tasks at system startup and providing individual tasks as needed. The high availability task subsystem works in conjunction with the recovery control task subsystem to maintain the operational state of the gateway by monitoring the various software and hardware components of the gateway. Recovery control task subsystem is responsible for executing a recovery action for failures that occur in the gateway and receives recovery actions from the high availability task subsystem. Shared configuration task subsystem provides the gateway with an ability to set, retrieve, and receive notification of gateway configuration parameter changes and is responsible for storing configuration data for the applications running within the gateway. Resource management subsystem is responsible for assigning resources (e.g., processor and memory capabilities) to tasks and for monitoring the task's use of the resources.

Virtual private network (VPN) subsystem manages the administrative and operational aspects of VPN-related entities in the gateway, which include creating separate VPN contexts, starting IP services within a VPN context, managing IP pools and subscriber IP addresses, and distributing the IP flow information within a VPN context. In some embodiments, within the gateway, IP operations are done within specific VPN contexts. The network processing unit subsystem is responsible for many of the functions listed above for the network processing unit. The card/slot/port subsystem is responsible for coordinating the events that occur relating to card activity such as discovery and configuration of ports on newly inserted cards and determining how line cards map to application cards.

The session subsystem is responsible for processing and monitoring a mobile subscriber's data flows in some embodiments. Session processing tasks for mobile data communications include: A10/All termination for CDMA networks, GSM tunneling protocol termination for GPRS and/or UMTS networks, asynchronous PPP processing, packet filtering, packet scheduling, Difserv codepoint marking, statistics gathering, IP forwarding, and AAA services, for example. Responsibility for each of these items can be distributed across subordinate tasks (called managers) to provide for more efficient processing and greater redundancy. A separate session controller task serves as an integrated control node to regulate and monitor the managers and to communicate with the other active subsystem. The session subsystem also manages specialized user data processing such as payload transformation, filtering, statistics collection, policing, and scheduling.

In providing emulation, as MIPv4 is received from a mobile node, the session subsystem can setup a MIPv4 termination and setup a PMIPv6 session towards the core network. A session manager can track the mapping of the sessions and processing to provide the emulation and interworking between the networks. A database can also be used to map information between the sessions, and store, for example, NAI, HoA, AE information in some embodiments.

In some embodiments, the software needed for implementing a process or a database includes a high level procedural or an object-orientated language such as C, C++, C#, Java, or Perl. The software may also be implemented in assembly language if desired. Packet processing implemented in a gateway can include any processing determined by the context. For example, packet processing may involve high-level data link control (HDLC) framing, header compression, and/or encryption. In certain embodiments, the software is stored on a storage medium or device such as read-only memory (ROM), programmable-read-only memory (PROM), electrically erasable programmable-read-only memory (EEPROM), flash memory, or a magnetic disk that is readable by a general or special purpose-processing unit to perform the processes described in this document.

Although the present invention has been described and illustrated in the foregoing exemplary embodiments, it is understood that the present disclosure has been made only by way of example, and that numerous changes in the details of implementation of the invention may be made without departing from the spirit and scope of the invention, which is limited only by the claims which follow. For example, while the gateway has been described as implementing a mobility access gateway (MAG) to provide emulation to a mobile node, other embodiments where a gateway implementing a packet data network gateway (P-GW) can provide the emulation to the mobile node.

We claim:

1. A method of providing communication network access on a network supporting both Mobile IP and Proxy Mobile IP, comprising:
    receiving a mobile IP (MIP) registration request at a mobility access gateway (MAG) from a mobile node;
    transmitting from the MAG a proxy mobile IP (PMIP) binding update to a local mobility anchor (LMA) to request a Mobile IP version 4 (IPv4) home address for the mobile node via the PMIP binding update;
    receiving at the MAG a PMIP binding acknowledgement from the LMA with the IPv4 address; and
    transmitting from the MAG a MIP registration reply including the IPv4 home address by emulating MIP.

2. The method of claim 1, wherein the MAG is implemented on a gateway and is a packet data network gateway (P-GW).

3. The method of claim 1, further comprising:
    receiving at the MAG from the mobile node a registration request to terminate a session; and
    transmitting a binding update to the LMA to terminate the session.

4. The method of claim 1, further comprising:
    transmitting identifying information of the mobile node from the MAG to an authentication, authorization, and accounting (AAA) server; and
    receiving, from the AAA server and at the MAG, the LMA address for the mobile node and security information.

5. The method of claim 4, wherein the security information is an authentication extension (AE).

6. The method of claim 1, wherein the network supports PMIPv6.

7. The method of claim 1, wherein a home address for the mobile node is obtained from a AAA server.

8. A gateway in a communication network comprising:
a mobility access gateway (MAG) that provides emulation of mobile IP (MIP) version 4 over an internet protocol (IP) version 6 network,
the MAG receiving a registration request from a mobile node using MIP version 4,
transmitting, from the MAG, a proxy mobile IP (PMIP) version 6 binding update to a local mobility anchor (LMA) to request an IP version 4 (IPv4) based home address,
receiving a PMIP version 6 binding acknowledgment containing the IPv4 based address, and
transmitting the IPv4 home address to the mobile node by emulating MIP.

9. The gateway of claim 8, wherein the MAG is a packet data network gateway (P-GW).

10. The gateway of claim 8, wherein the MAG receives a registration request to terminate a session from the mobile node and transmits a binding update to the LMA to terminate the session.

11. The gateway of claim 8, wherein the MAG receives an LMA address for the mobile node and security information from an authentication, authorization, and accounting (AAA) server.

12. The gateway of claim 11, wherein the security information is an authentication extension (AE).

13. The gateway of claim 8, wherein the network supports PMIPv6.

14. The gateway of claim 8, wherein a home address for the mobile node is obtained from a AAA server.

15. The gateway of claim 8, wherein the network supports PMIPv6.

16. The gateway of claim 8, wherein a home address for the mobile node is obtained from a AAA server.

17. A method of providing communication network access on a network supporting both Mobile IP and Proxy Mobile IP (PMIP), the method comprising:
sending a mobile IP (MIP) registration request from a mobile node to a mobility access gateway (MAG) to obtain an IP version 4 (IPv4) home address from a local mobility anchor (LMA) operating in an internet protocol (IP) version 6 network, wherein the registration request includes identification information of the mobile node; and
receiving at the mobile node a MIP registration reply including the IPv4 home address transmitted over the PMIP based network from the LMA, wherein the MIP registration reply is emulated.

18. The method of claim 17, wherein the MAG is implemented on a gateway and is a packet data network gateway (P-GW).

19. The method of claim 17, wherein the registration request includes an authentication extension (AE) for providing security information.

20. Logic encoded in one or more non-transitory media that includes code for execution and when executed by a processor is operable to perform operations on a network supporting both Mobile IP and Proxy Mobile IP, comprising:
receiving a mobile IP (MIP) registration request at a mobility access gateway (MAG) from a mobile node;
transmitting from the MAG a proxy mobile IP (PMIP) binding update to a local mobility anchor (LMA) to request a Mobile IP version 4 (IPv4) home address for the mobile node via the PMIP binding update;
receiving at the MAG a PMIP binding acknowledgement from the LMA with the IPv4 address; and
transmitting from the MAG a MIP registration reply including the IPv4 home address by emulating MIP.

* * * * *